July 29, 1952  T. B. GIBBS ET AL  2,605,218
ELECTROLYTIC METHOD AND APPARATUS FOR THE
MANUFACTURE OF TAPERED CONDUCTORS
Filed March 9, 1944  5 Sheets-Sheet 5
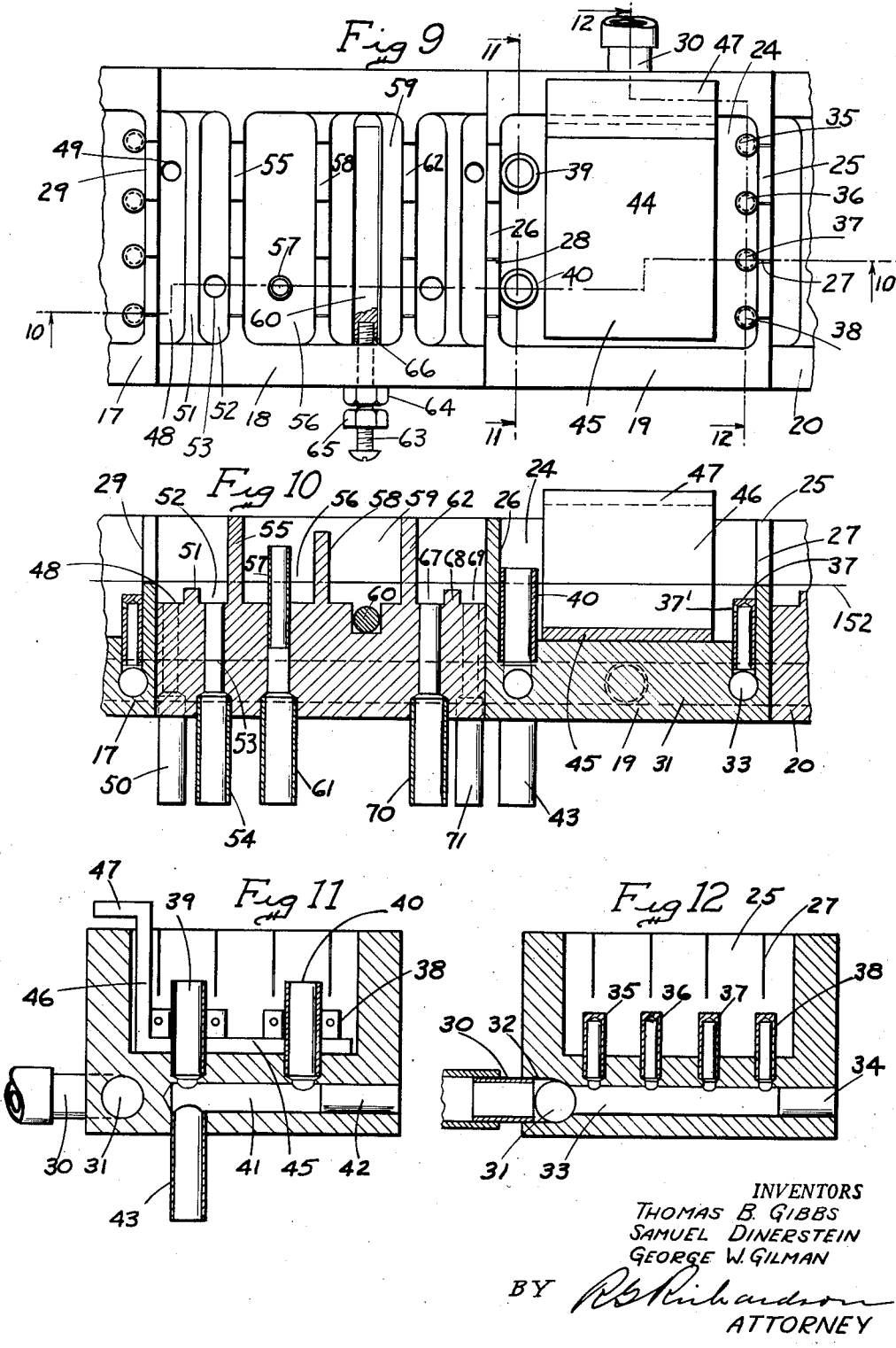
INVENTORS
THOMAS B. GIBBS
SAMUEL DINERSTEIN
GEORGE W. GILMAN
BY R. B. Richardson
ATTORNEY Patented July 29, 1952

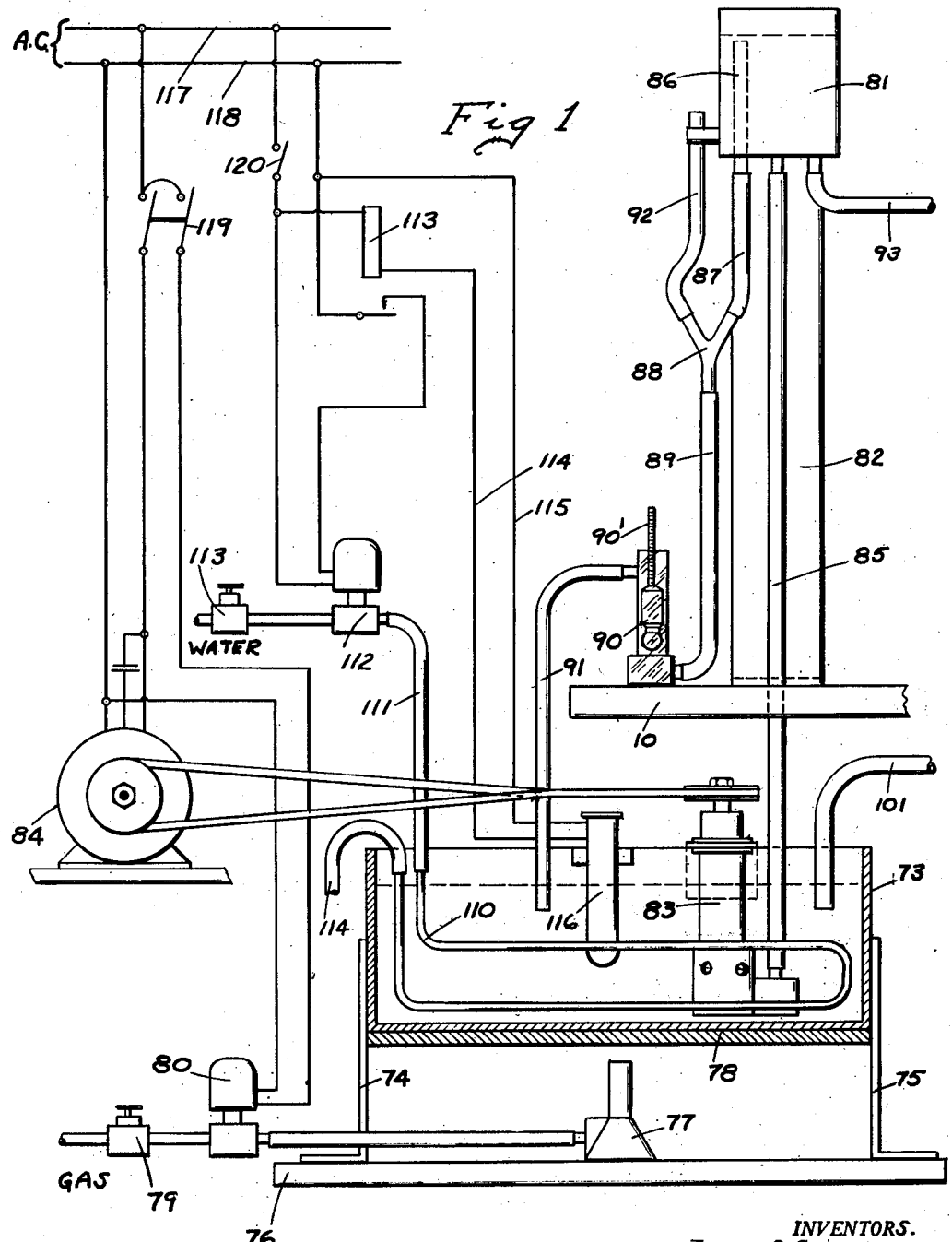

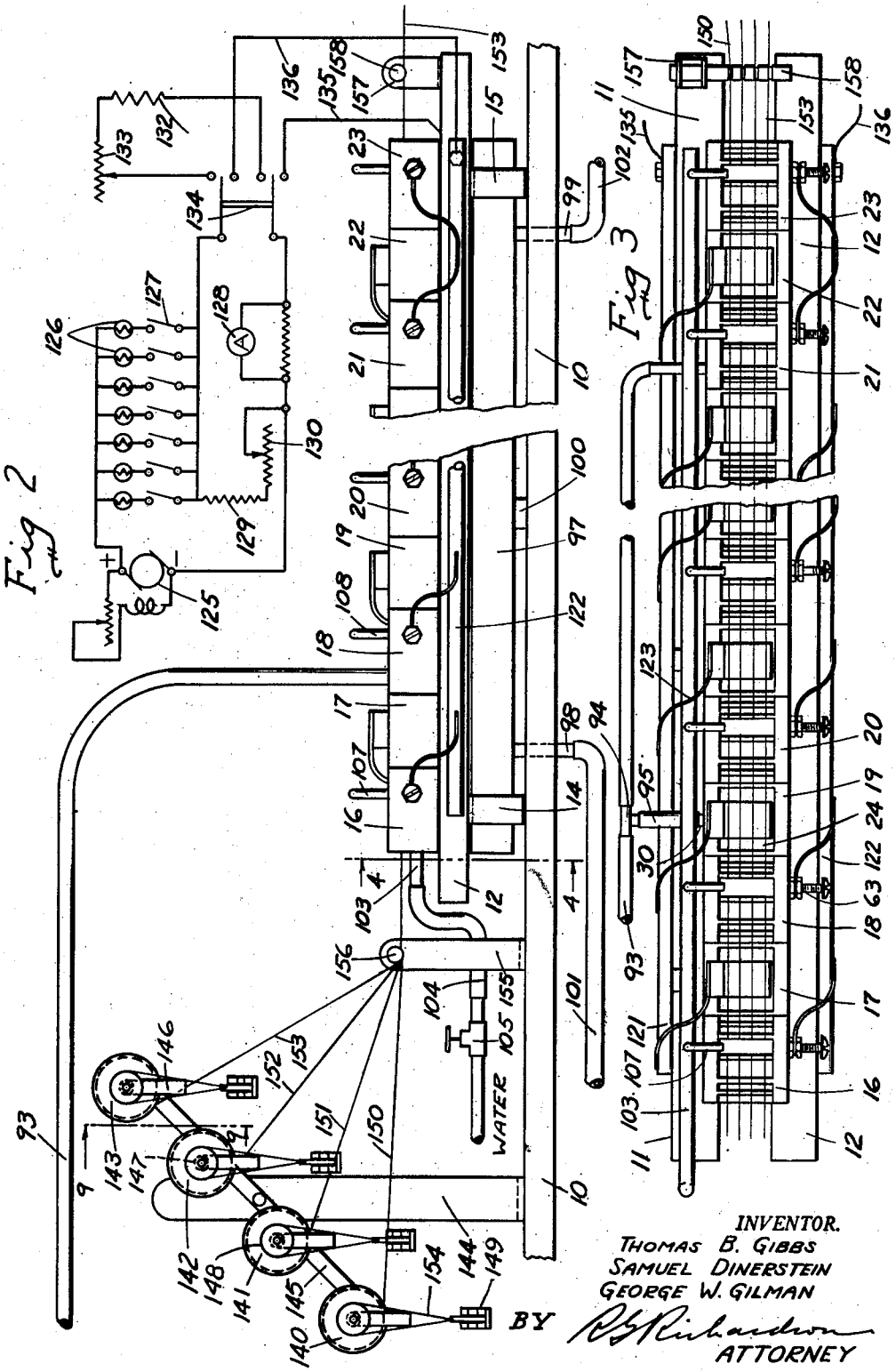

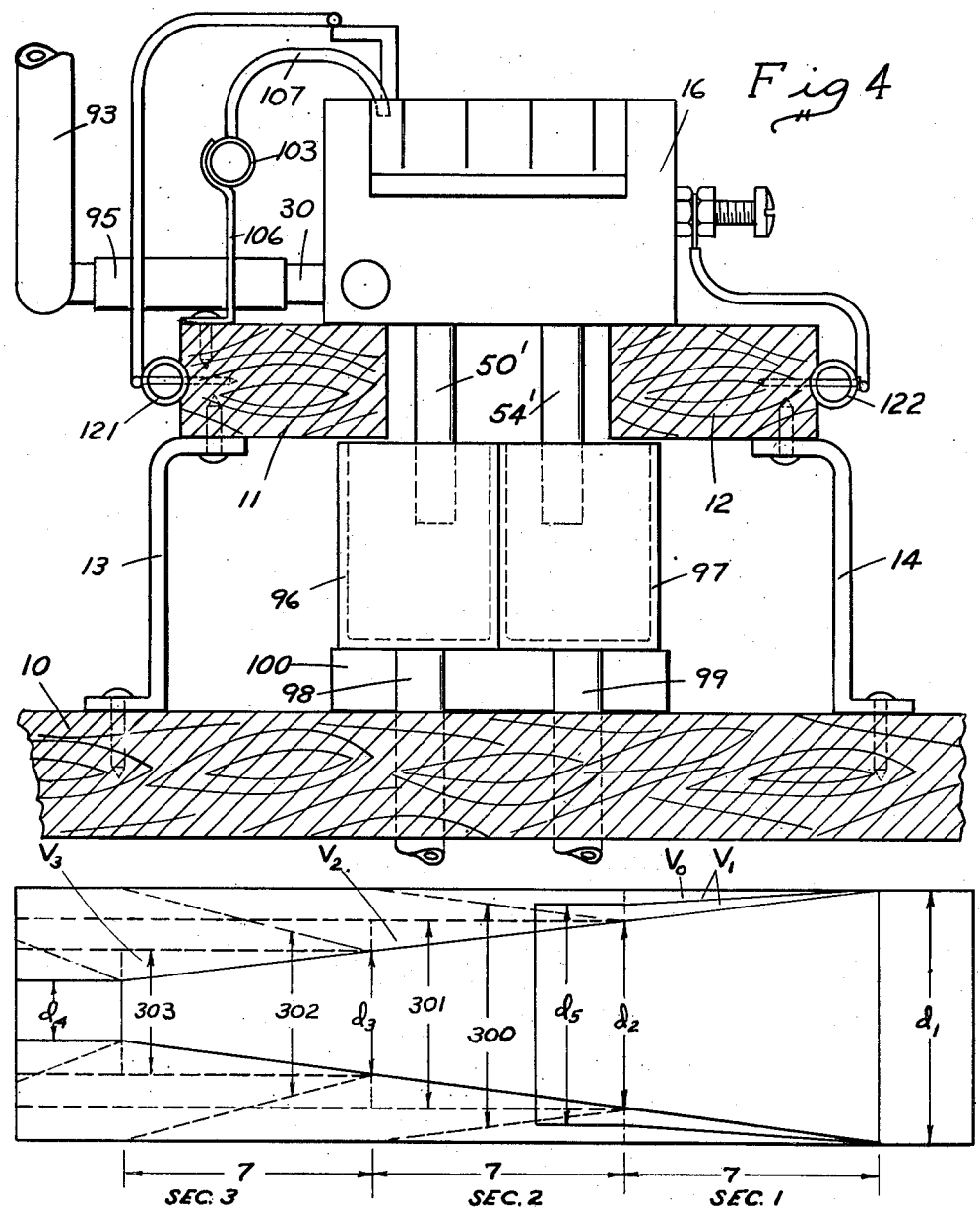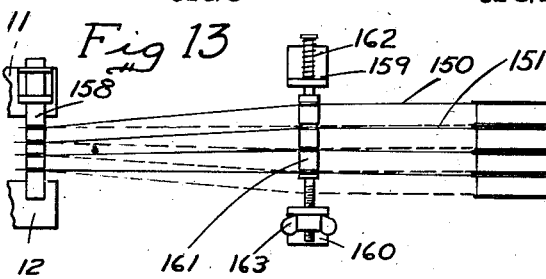

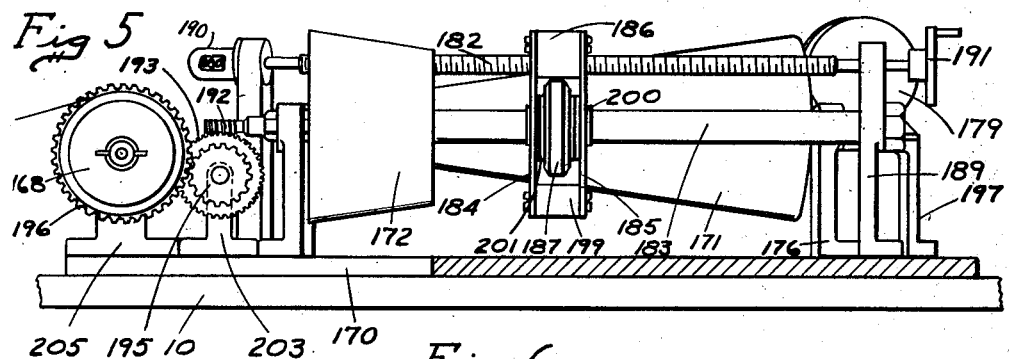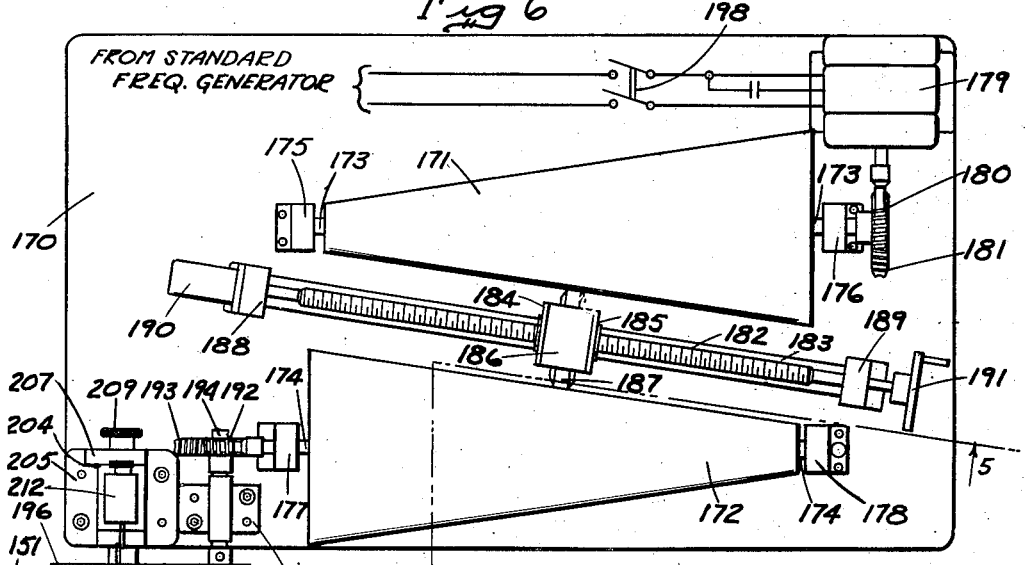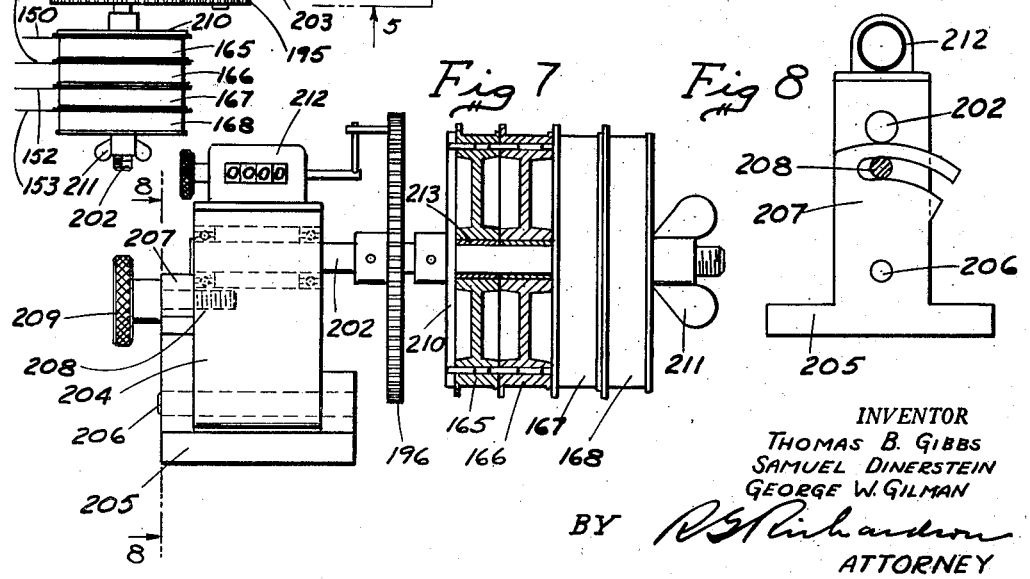

2,605,218

UNITED STATES PATENT OFFICE 2,605,218

ELECTROLYTIC METHOD AND APPARATUS FOR THE MANUFACTURE OF TAPERED CONDUCTORS

Thomas B. Gibbs, Delavan Lake, Samuel Dinerstein, Delavan, and George W. Gilman, Janesville, Wis., assignors to The George W. Borg Corporation, Chicago, Ill., a corporation of Delaware Application March 9, 1944, Serial No. 525,764

3 Claims. (Cl. 204—142)

1

The present invention relates to methods and apparatus for the manufacture of tapered conductors, and the object of the invention is to produce new and improved methods and apparatus of this character, whereby tapered conductors in a variety of forms may be produced in a reasonable time and at small cost.

Tapered conductors such as referred to herein may be used for various purposes, but an important use is in the manufacture of non-linear rheostats or potentiometers. By a non-linear potentiometer is meant a potentiometer in which equal movements of the slider from different starting positions result in unequal changes in resistance. Such potentiometers have been constructed by winding resistance wire on a tapered form, and potentiometers constructed in this way are satisfactory for some purposes. There are objections, however, such as difficulties in winding and the impossibility of obtaining a rapid increase in the resistance per turn without unduly increasing the size of the potentiometer.

Non-linear potentiometers have also been constructed by means of a tapered conductor which is made by splicing together short sections of resistance wire of different diameters. Utilizing this method, a tapered conductor is produced which tapers by stages, or step-wise, from one end to the other. For a practical potentiometer, however, the number of steps must be rather large and the cost of splicing the numerous sections required is high. There are also winding difficulties. Hensce, this method is not very successful.

The foregoing will make evident the need for a one piece tapered conductor, having desired characteristics as to rate and degree of taper, adapting it for use in the construction of non-linear potentiometers. This requirement is met by the present invention, which makes it possible to manufacture such conductors for the first time, so far as known.

According to the invention, a tapered conductor is manufactured from a conductor of uniform cross-section by subjecting the wire to anodic reduction in an electrolytic bath. The wire is drawn through the bath at a relatively high speed at first; and the taper is produced by gradually decreasing the speed, thereby progressively increasing the time in the bath and the amount of metal removed from the wire. The resulting wire has the original diameter at one end and any desired diameter at the other end, with the understanding, of course, that a limitation will be imposed here by the minimum tensile strength

2 requirements. In practice wire has been reduced from a diameter on the order of 4 or 5 mils or larger to a diameter of .9 mil, which is about the smallest size of wire that has the necessary mechanical strength.

It may be pointed out, moreover, that by suitably varying the rate at which the speed is changed, different forms of taper can be produced. Thus, tapers corresponding to various exponential curves can be produced as well as a straight line or conical taper.

While the principle employed is relatively simple, the application of the principle to the successful manufacture of tapered wires in commercial quantities is attended with many difficulties. To mention just a few of these difficulties, the amount of metal removed from a wire undergoing treatment is not only dependent upon the time in the bath, but upon the value of the current and upon the anode current efficiency. The current tends to vary in accordance with the size of the wire exposed to the action of the bath, which becomes progressively smaller as the process continues. The anode current efficiency varies with the temperature of the bath and the concentration of the electrolyte. Another problem is to obtain a bright, smooth finish on the wire, which requires a high current density and accurate control over the specific gravity of the electrolyte. Still another problem is to obtain a high enough current so that the process will not take an abnormaly long time. The seriousness of this problem may be appreciated from the fact that the wire operated on is resistance wire, having low conductivity, resulting in the fact that the current required for commercial operation of the process is many times greater than the carrying capacity of the wire. A still further problem is introduced by the fact that although the resistance wire material has a fair tensile strength, many of the tapered wires which have to be made are extremely fine and are rather weak at the small end, therefore. The strength of some of these fine wires is measured in ounces rather than in pounds. This makes it impossible to use any type of pulley system to guide the wire repeatedly through the electrolytic bath. The force required to pull the wire through a system of this kind would break the wire before the required reduction in diameter is obtained. The making of a good electrical connection to the moving wire is another problem, especially since any friction produced would increase the force required to move the wire.

The foregoing and other problems are solved in a satisfactory manner by the present invention, as will be fully explained in the detailed specification. It may be pointed out at this time, however, that the problem of obtaining the required high anode current is solved by providing a large plurality of small electrolytic cells, arranged in a row, through which the wires are drawn on straight lines. Electrical connections are made to the wires on both sides of each cell, so that no part of any wire has to carry more than a small fraction of the total current. Compartments containing mercury are arranged alternately with the electrolytic cells for this purpose. The substantially frictionless nature of the sliding connections formed by the mercury, coupled with the fact that the wires move through the mercury compartments and the electrolytic cells on straight lines, makes the force required to move the wires very small.

It may also be mentioned at this time that the successful operation of the invention from the standpoint of producing tapered conductors with predetermined tapers, reproducible at will, is due in large part to the elimination of all variable factors which affect the rate of anodic reduction, with the single exception of the time factor. The time in the bath, depending on the rate at which the wire is pulled through the bath, is rigidly controlled in accordance with the particular form of taper to be produced.

Proceeding now with the detailed explanation, the apparatus will first be described, reference being had to the accompanying drawings, in which—

Fig. 1 is a more or less diagrammatic view showing in elevation some of the principal parts of the electrolyte circulating system, including the main and auxiliary tanks;

Fig. 2 shows the electrolytic cell system in elevation, and also the arrangement for supporting the spools containing wire to be processed;

Fig. 3 is a plan view of the electrolytic cell system;

Fig. 4 is a cross-section on the line 4—4, Fig. 2;

Fig. 5 shows the wire pulling mechanism in elevation;

Fig. 6 is a plan view of the same;

Figs. 7 and 8 show details of the take-up spools and their supporting arrangements;

Fig. 9 is a plan view, showing one of the electrolytic cells complete with an associated mercury compartment, substantially full size;

Fig. 10 is a section on the line 10—10, Fig. 9;

Fig. 11 is a section on the line 11—11, Fig. 9;

Fig. 12 is a section on the line 12—12, Fig. 9;

Fig. 13 is a supplementary drawing showing the arrangement for guiding the processed wires onto the take-up spools; and Fig. 14 is a diagrammatic layout of a tapered wire.

Figs. 1, 2 and 5, when properly arranged, show the complete apparatus in elevation. In order to connect these drawings, the sheets bearing Figs. 1 and 5 should be placed upright, with the sheet bearing Fig. 2 between them and on its side; and the sheets should be adjusted so that the broken parts of the bench, table, or base 10 are in alignment. When the sheets are thus arranged the drawings show the electrolytic cell system, Fig. 2, in the center, with the electrolyte supply on the left, Fig. 1, and the wire pulling mechanism on the right, Fig. 5. The wires or conductors being processed are carried on the spools such as 143, Fig. 2, and are pulled through the electrolytic cells from left to right by means of the transfer or take-up spools such as 168, Fig. 5.

It will be convenient to describe the electrolytic cell system first, reference being had to Figs. 2, 3 and 4, and also to the detail drawings Figs. 10 to 13, inclusive.

The reference character 10 indicates the top of a bench, table or other support, referred to hereinafter as a base, which is conveniently located about 3 or 4 feet above the floor so that the parts mounted on the base will be readily accessible to the operator. The base may be of wood or any suitable material.

The electrolytic cells are supported upon two parallel spaced strips 11 and 12, which are held in position a short distance above the base 10 by means of a number of brackets such as 13 and 14, Fig. 4, and 14 and 15, Fig. 2. These strips may also be of wood, and together with the base 10, are preferably given a coating of acidproof paint. The cells are arranged on the two strips 11 and 12 in a row extending parallel to the strips as shown in Figs. 2 and 3, and each cell rests partly on strip 11 and partly on strip 12, bridging the space between them, as seen clearly in Fig. 4.

The number of electrolytic cells is variable, but there should be a considerable number of them. There may be, for example, 16 complete electrolytic cells, of which only a few are shown in Figs. 2 and 3. Each cell is made in two sections, which may be referred to as cathode and electrical contact sections, respectively. The cathode and electrical contact sections alternate in the cell assembly. Thus, the sections 16, 18, 20, etc. are electrical contact sections, while the sections 17, 19, etc. are cathode sections. The sections 16 and 17 may be regarded as constituting the first electrolytic cell, sections 18 and 19, the second, and so on.

Due to the arrangement of the cells in a compact row, however, the cathode section of each cell has adjacent thereto on the right the electrical contact section of the next cell, that is, each cathode section is between two electrical contact sections, the last electrical contact section 23 being added to carry out the arrangement. From a functional standpoint, therefore, each compete electrolyte cell may be regarded as being composed of a cathode section and two electrical contact sections. Considered on this basis, the sections 16, 17 and 18 constitute the first cell, sections 18, 19 and 20, the second, and sections 21, 22 and 23, the last, each electrical contact section except the end sections 16 and 23 being common to two cells.

Before going any farther into the cell assembly it will be well to explain the structure of the individual cell sections, reference being had to Figs. 10 to 13, inclusive, which show the electrical contact section 18 and the cathode section 19. The electrical contact sections are all like section 18 and the cathode sections are al like section 19, so it will be sufficient to describe these two sections.

The sections may be made of various materials. and may be constructed in various ways. Acidproof material should be used, or the cells should be coated with acidproof paint. A convenient material to use is polystyrene, which is not attacked by the acids of which the electrolyte is composed. The sections shown are made from solid blocks of polystyrene by machining and drilling operations.

The electrical contact section 18 has a plurality of cavities or compartments, separated by partitions, whereas the cathode section 19 has only a single compartment. The partitions and the walls of the cathode section are slotted to receive the conductors being processed and consequently the compartments which contain water or electrolyte are not leakproof. Certain of the compartments are provided to take care of the leakage problem which thus arises. This will all be fully explained.

Considering the cathode section 19, there is a single rectangular compartment 24, for electrolyte, having the slotted end walls 25 and 26. There are four slots such as 27 and 28 in each end wall. The width of the slots should be just slightly greater than the diameter of the largest wire to be processed and may be .012 inch, for example, or 12 mils. The depth of the slots is about one-half the height of the walls as will be clear from the showing of slot 27, Fig. 11.

Electrolyte is supplied to the compartment 24 through a nipple 30, which is set into an opening 32, Fig. 12, communicating with the bore 31 extending lengthwise through the cathode section 19, as indicated by the dotted lines in Fig. 10. The bore 31 is intersected by the cross bore 33, Figs. 10 and 12, the end of which is closed by the plug 34. This cross bore supplies electrolyte to the four nozzles 35, 36, 37 and 38, which are set in openings drilled in the bottom of the compartment 24 to meet the cross bore 33. The construction of the nozzles will be clear from Figs. 10 and 12. Each nozzle has a single rather small opening such as 37' arranged to direct the flow of electrolyte upward and toward the opposite end of the cell. It will be noted that the four nozzles are in alignment, respectively, with the four conductor slots such as 27 in the wall 25 of the compartment 24.

There are two overflow tubes, indicated at 39 and 40, Figs. 9 and 11. These tubes are set in holes drilled in the bottom of the compartment 24 to meet the cross bore 41, the end of which is closed by the plug 42. The drain pipe 43 is inserted in another hole which is drilled up through the bottom to intersect the cross bore 41.

The nipple 30, nozzles 35–38, plugs 34 and 42, and tubes 39, 40 and 43 are preferably made of polystyrene. Before assembly the contacting surfaces are painted with a cement made by dissolving polystyrene in a suitable organic solvent. The solvent evaporates after the parts are assembled and leaves them firmly attached to the main block of which the cathode section is fabricated.

The longitudinal bore 31 in the cathode section 19 is in alignment with similar bores in all the other sections, and these bores, therefore, form a continuous conduit extending through the complete cell assembly. The conduit is closed at both ends by polystyrene plugs, or the bores may be omitted from the end sections 16 and 23. Electrolyte is supplied to the conduit by means of a number of tubes which connect with nipples such as 30 as will shortly be explained. The direction of flow through the cathode section 19 may be traced at this time, however. The electrolyte passes from the conduit (bore 31) to the cross bore 33, and from the cross bore it is supplied to the compartment 24 by the four nozzles 35–38. The compartment 24 is maintained full of electrolyte up to the top of the overflow tubes 39 and 40, the surplus passing down these tubes to the cross bore 41 from which it is drained off through the drain pipe 43. The collection of the electrolyte from the drain pipes such as 43 and its return to the circulating system will be explained later.

The cathode is indicated by the reference character 44, Fig. 9, and comprises a horizontal section 45, which rests on the bottom of the compartment 24, a vertical section 46 which extends upward out of the compartment, and a short horizontal section 47 which extends partly over the rear wall of the compartment. The cathode is shown in Figs. 9, 10 and 11 but the shape thereof is best seen in Fig. 11. The cathode is preferably made of a special graphite which is sold under the trade-mark "Karbate." This material is very dense, having a porosity of less than 1%, and has relatively high heat and electrical conductivity as compared to other forms of carbon. The section 47 of the cathode should be copper plated so that a conductor can be soldered on, as indicated in Fig. 3. Then the sections 47 and 46 are coated with acidproof paint so that only the section 45 will be effectively in contact with electrolyte.

Considering the electrical contact section 18 now, the first compartment 48 at the left is an electrolyte collecting compartment and is provided to collect the electrolyte that leaks through the slotted wall 29 of the adjacent cathode section 17. The electrolyte is drained off as fast as it is collected through the hole 49 in the bottom of the compartment, which connects with the drain pipe 50, Fig. 10.

A low partition 51 separates compartment 48 from the second compartment 52, which is a water collecting compartment, provided to collect the water which leaks through the slotted partition 55. A hole 53 in the bottom of compartment 52 connects with the drain pipe 54 and drains off the water as fast as it is collected.

To the right of the partition 55 is the washing compartment 56, which is provided with an overflow tube 57, set in a hole drilled through the bottom of the compartment. At the opposite end of the hole the drain pipe 61 is inserted.

The next compartment is the mercury compartment, formed by the partitions 58 and 62. This compartment is recessed at the bottom to receive a rod 60, made preferably of some metal such as molybdenum which is a fairly good conductor and is not readily attacked by mercury. The terminal screw 63 passes through a hole drilled in the front wall of the compartment 59 of rod 60. The rod 60 is drawn up against the rod 60. The rod 60 is drawn up against the wall of the compartment by means of a nut 64, a washer 66 being interposed to seal the opening if desired, although this is not strictly necessary. A second nut 65 is provided to enable a conductor to be connected to the terminal screw 63.

The compartment 59 is filled with mercury up to a short distance below the top of partition 58, or well above the bottoms of the slots in the various partitions and walls which receive the conductors being processed. These conductors pass through the mercury, therefore, which is provided in order to make a good sliding connection to the moving conductors from the terminal 63. The rod 60 is provided in order to make the resistance between the terminal and the several conductors substantially the same.

The mercury does not leak out of compartment 59 through the slots in the partitions 58 and 62, due to the narrow width of the slots and to the fact that the mercury does not wet the polystyrene of which the partitions are composed nor the conductors being processed. The surface tension of the mercury, therefore, prevents its escape through the slots in the partitions.

Water is continuously supplied to the mercury compartment 59 by an arrangement which will be described shortly. The water overflows the partition 58 and fills the washing compartment 56 up to the top of the overflow tube 57, through which it drains off.

To the right of the mercury compartment 59 there are two compartments 67 and 69 which are separated by the low partition 68. Compartment 67 is provided to collect the water which leaks through the slotted partition 62 while compartment 69 is for collecting the electrotype that leaks through the slotted wall 26 of the electrolyte compartment 24 of the adjacent cathode section 19. The compartments 67 and 69 have holes drilled in the bottom in which there are inserted the drainage pipes 70 and 71.

The various tubes or pipes of the anode section 18, such as 50, 54, etc. are attached by means of polystyrene cement, as in the case of the cathode section 19. It will be understood of course that the sections themselves are secured together in the same way. When assembled and cemented together the sections become firmly united and the structure is as rigid and strong as if fabricated from one continuous block of polystyrene.

The main electrolyte tank is indicated at 73, Fig. 1, and is supported on a suitable sub-base 76 by means of brackets such as 74 and 75, the arrangement being such that the tank 73 is below the level of the base 10. The tank 73 may be made of any suitable material. It may be made of sheet steel, for example, and in this case is coated with acidproof paint.

Suitable means is provided for heating the tank 73, shown as comprising a Bunsen burner 77. The supply of gas to the burner is controlled by means of a manually operated valve 79 and an electromagnetically operated valve 80. The reference numeral 78 indicates a heavy metal plate secured to the bottom of the tank to distribute the heat from the burner.

In addition to the main electrolyte tank 73 there is an auxiliary tank 81, which is supported about 3 feet above the base 10 in any suitable manner, as by means of an upright member 82.

The electrolyte is transferred from the main tank 73 to the auxiliary tank 81 by means of a centrifugal pump 83, driven by the motor 84. The pump 83 may be of known construction, adapted for pumping acid. The casing and impellor may be made of polystyrene, for example, and the shaft of stainless steel.

The electrolyte flows from the pump 83 to the tank 81 through a hose connection 85. Rubber hose may be used here, as it is for other connections to be described. The tank 81 is maintained full of electrolyte to the top of the overflow pipe 86, and supplies electrolyte to the electrolytic cells, as will be described. The excess overflows through the pipe 86 and passes by way of the hose connections 87 and 89 to the vessel 90, containing a hydrometer 90'. A constant level in the vessel 90 is maintained by the overflow connection 91, through which the excess electrolyte returns to the main tank 73. The Y connection 88 and the short hose 92, open at the upper end, are provided in order to get rid of air entrapped in the overflow from the tank 81 and thus avoid an excess of bubbles in the vessel 90, which would otherwise interfere with the reading of the hydrometer.

The electrolyte is delivered by gravity from the tank 81 through the hose 93 to the electrolytic cells in Fig. 2. For this purpose a plurality of T connections such as 94 may be provided, together with short pieces of hose such as 95, by means of which connections are made with the nipples such as 30. Thus the main supply hose 93 is connected with the channel or conduit 31 in the electrolytic cell system at a plurality of points, tending to equalize the pressure at all the cells.

The wash water is supplied to the electrolytic cell system through a pipe 103, which is connected to the water supply system through a hose connection 104 and a valve 105. The pipe 103 is supported on the strip 11 by means of brackets such as 106, as shown in Fig. 4, and is equipped with a plurality of nozzles such as 107, 108, etc., one for each electrical contact section, by means of which water is delivered to the mercury compartments of such sections. The water pressure may be regulated by the valve 105 and should be sufficient to maintain a good circulation through the washing compartments such as 56.

The arrangement for collecting the electrolyte and wash water from the electrolytic cell system may now be described. Referring to Figs. 2 and 4, it will be seen that two troughs 96 and 97 are provided, which are supported on the base 10 by means of blocks such as 100 and which extend beneath and parallel to the electrolytic cell system. The troughs are so disposed that all the drain pipes such as 50', 50, 71, 43, etc., which carry electrolyte, empty into the trough 96, whereas the drain pipes such as 54', 54, 61, 70, etc., which carry water, empty into the trough 97. The trough 96 has an outlet pipe 98 and a hose connection 101, by means of which the electrolyte collecting in the trough is drained back to the main tank 73. The trough 97 has an outlet pipe 99 and a hose connection 102, by means of which the water collecting in the trough is disposed of.

Returning now to Fig. 1, it was mentioned that the main tank 73 is heated by suitable means such as the Bunsen burner 77. The flow of gas to the burner is adjusted by means of the valve 79 so that the burner is adapted to maintain the electrolyte at a temperature which is somewhat higher than the desired or optimum temperature and means is provided to cool the electrolyte whenever its temperature rises slightly above the desired value. The cooling means comprises one or more coils of glass tubing 110. Water is supplied to the tubing 110 through a hand valve 113', an electromagnetically operated valve 112, and a hose connection 111. The hose connection 114 leads to the waste pipe or drain.

The valve 113' is open when the apparatus is in operation and the admission of water to the cooling coil 110 is controlled by the valve 112, which in turn is controlled by the relay 113. The relay circuit includes conductors 114 and 115 which lead to a thermally operated switch 116 which is immersed in the electrolyte in the main tank. When the temperature of the electrolyte rises to a predetermined point which is slightly higher than the desired temperature the switch 116 closes the circuit of relay 113 and the relay energizes. The operation of the relay closes a circuit for the electromagnetically operated valve 112, which thereupon opens, starting the flow of water through the coil 110. The rise in the temperature of the electrolyte is thus arrested and it shortly begins to fall with the result that the switch 116 opens, the relay 113 is deenergized, and the valve 112 is closed again.

Fig. 1 also shows the power leads 117 and 118, which may be connected to any convenient A. C. outlet. From these leads current is supplied to the motor 84, relay 113 and the electromagnetically operated valves 80 and 112. A switch 119 controls the circuit of the motor 84 and the circuit of valve 80. Another switch 120 is in the circuits of relay 113 and valve 112.

The electrical connections to the electrolytic cells may now be explained. Two bus bars are provided, which may be made of copper tubing, and are attached in suitable manner to the outside edges of the strips 11 and 12. They extend throughout the length of the electrolytic cell assembly. All the cathodes are connected in parallel to the bus bar 121 by means of short conductors such as 123, which are soldered to the cathodes and to the bus bar. All the terminals such as 63 are connected in a similar manner to the bus bar 122.

Power for the electrolytic cells may be supplied by a motor generator set, of which only the generator 125 is shown. As indicated, the generator 125 is a shunt wound, direct current generator, with field rheostat. The negative and positive output leads from the generator terminate in a double pole double throw switch 134, which in one position connects the generator to an artificial load comprising the resistance 132 and rheostat 133, and in the other position connects the generator to the conductors 135 and 136, which are connected to the bus bars 121 and 122 respectively. Associated with the positive side of the circuit there are a plurality of current regulating devices each of which is provided with an individual switch such as 127. Six of these devices are preferably of two ampere capacity, while the seventh is of one ampere capacity. An ammeter 128 is connected in the negative side of the circuit. A high shunt resistance 129, in series with the rheostat 130, provides for a fine adjustment of the output.

The conductors or wires to be processed are wound on spools from which they are drawn off during the processing operation. Fig. 2 shows four spools 140, 141, 142 and 143 carrying four wires 150, 151, 152 and 153, respectively, which have been connected up preparatory to pulling them through the electrolytic cell system.

The spools 140–143 are carried on a diagonally disposed cross member 145 which is secured to a vertical support 144 mounted on the base 10. The spools are rotatable to permit the wires to be drawn off, but rotation of the spools is opposed by individual friction brakes in order to keep the wires taut. There is a U shaped bracket 146 which is suitably attached to the cross member 145. The spool 143 is carried on a shaft 147 which is rotatable in bearings formed by semi-circular notches cut in the ends of the two legs of bracket 146. The shaft 147 has an enlarged central portion which at one end is a little larger than the hole in the spool, being made with a slight taper, however, so that the spool can readily be pressed onto the shaft by hand or removed therefrom. The pulley 148 is fixed to the shaft 147 and supports a weight 149 by means of a cord 154. When the spool is rotated by drawing off the wire 153, the shaft 147 and pulley 148 rotate with it, the rotation being opposed by the weighted cord which slips in the pulley groove. Weights of different sizes may be provided, and they are preferably slotted like scale weights so that they can readily be changed to vary the braking effect.

After leaving the spools 140–143, the wires 150–153 pass beneath the grooved rod 156 before entering the electrolytic cell system. This rod is supported on base 10 by means of the bracket 155. Rod 156 is not shown in the plan view, Fig. 3, but is similar to the grooved rod 158. The function of the rod 156 is to guide the wires properly into the electrolytic cell system, and for this purpose the grooves are spaced the same as the slots in the various partitions, while the rod is supported at the correct elevation to hold the wires at the bottom of the slos.

The grooved rod 158, supported on bracket 157, performs a similar function at the other end of the electrolytic cell system. The rods 156 and 158 can be supported for rotation if desired, but this is not necessary provided they are made of some hard, smooth material. They may be made of glass, for example.

After leaving the electrolytic cell system, Figs. 2 and 3, the wires 150–153 pass to the take-up spools 165–168 on the wire pulling mechanism, Figs. 5 and 6, there being, however, an intervening grooved guide rod 161, Fig. 13, which will presently be described. The wire pulling mechanism will be described next.

This apparatus is mounted on a metal plate 170 which rests on the base 10, and consists essentially of two oppositely disposed rotatable cones 171 and 172, a motor 179 for driving the first cone 171, an axially movable wheel 187 for coupling the two cones 171 and 172, and suitable gearing by means of which the second cone 172 drives the take-up spools 165—168 at a variable speed determined by the position of the coupling wheel 187.

The motor 179 may be a split phase synchronous motor and is mounted on a support 197 which rests on the plate 170. The motor may be operated on commercial alternating current, supplied through a switch 198, but preferably a standard frequency generator is provided to run the motor, as indicated in the drawing, in order to avoid speed variations due to changes in frequency. The motor speed may be 1800 R. P. M.

The cone 171 may be of any suitable material, such as aluminum, for example, and is supported on a shaft 173 which is rotatable in bearings provided at the upper ends of the supports 175 and 176. These supports rest on and are secured to the plate 170. The motor 179 drives the cone 171 by means of a worm 180 fixed to the motor shaft and a worm wheel 181 fixed to the shaft 173. The gear ratio may be 1 to 18, for example, in which case the speed of the cone will be 100 R. P. M.

The cone 172 is similar to the cone 171 and is mounted on a shaft 174, which is rotatable in bearings with which the supports 177 and 178 are provided.

The second cone 172 is driven from the first cone 171 by means of an axially movable wheel 187, as previously mentioned. The wheel 187 is supported on a sliding carrier comprising the two side members 184 and 185 which are rigidly clamped to the two spacers 186 and 199, the former of which is drilled and tapped to receive the lead screw 182. A tubular sleeve 200 is rigidly secured to the side members 184 and 185 of the carrier, as by a drive fit, and is slidable on the fixed shaft 183. The wheel 187 is preferably a rubber tire mounted on a hub 201 which is rotatable on the sleeve 200, suitable washers being interposed between the hub and the side members 184 and 185 as indicated. The shaft 183 is secured to and supported on two upright standards 188 and 189 which are mounted in spaced relation on the plate 170. The lead screw 182 is provided with bearings at the upper ends of these standards, and is adapted to be rotated by means of the hand wheel 191. A counter 190 is mounted on the standard 188, is connected to the lead screw, and functions to indicate the instant position of the carrier or wheel 187, as measured by rotations of the lead screw.

It will be seen that by rotating the hand wheel 191 in one direction or the other the carrier and the wheel 187 can be traversed in either direction along the fixed shaft 183. By rotating the hand wheel in a clockwise direction, for example, the carrier can be moved to the right until the wheel 187 engages the cone 171 where it has the largest diameter and at the same time engages the cone 172 where it has the smallest diameter. The counter 190 should be so related to the lead screw that it reads zero in this position of the wheel 187. By rotating the handwheel 191 in the opposite direction the carrier and the wheel 187 are moved to the left and the movement may be continued until the wheel 187 engages the cone 171 where it has the smallest diameter and cone 172 where it has the largest diameter. The reading of the counter at this point depends on the pitch of the lead screw. It may be assumed that 160 turns of the lead screw are required to traverse the carrier from one extreme position to the other. It will be understood that the hand wheel 191 cannot be operated unless the cones are rotating.

The shaft 174 on which cone 172 is mounted drives a countershaft 194 by means of a worm 192 and worm wheel 193, and the said countershaft drives the shaft 202 by means of the spur gears 195 and 196. These gears may be secured to their respective shafts by means of set screws, so that they may be changed if it should become necessary to shift the speed range up or down. The shaft 194 is rotatably mounted on a suitable support 203. The shaft 202 is rotatably mounted on a movable supporting block 204 so that the distance between the centers of shafts 202 and 194 can be changed if made necessary by a change of gears. This construction is shown in Figs. 7 and 8. The block 204, which supports shaft 202, is carried on a support 205 to which it is pivoted by means of a pin 206. The support 205 includes a vertically disposed slotted member 207. The block 204 is secured in position by means of a clamping screw 208, which lies in the slot in member 207 and is threaded into a tapped hole in the block 204. The clamping screw 208 may conveniently be provided with a knurled head 209. It will be seen that when the screw is loosened up the block can be rotated to right or left on the pivot pin 206, Fig. 8, and can then be secured in the desired position by tightening the clamping screw.

The take-up spools 165-168 are mounted on the shaft 202 as shown. There is a disc 210 secured to the shaft 202 and the spools 165-168 are clamped against this disc by means of a wing nut 211. The construction of the spools will appear clearly from Fig. 7, which shows two of them in section. They may be molded from suitable plastic material. Describing the spool 165 briefly, it has a winding space bounded by two flanges, of which the flange at the left is several times higher than the other. The wire being processed, such as wire 150, is wound on from left to right, starting next to the higher flange, and the end of the wire is attached to the spool by inserting it in a notch in the flange and bending it back. The circumference of the winding space should have some convenient value, to facilitate relating the number of feet of wire on the spool to the number of turns, and may be exactly one foot, for example. The spool has to be rotatably mounted when the wire is drawn off in the winding operation and to this end is provided with a bearing sleeve 213.

The spools 165-168 are all alike and it will be understood that a considerable number of them will be provided in order to permit continuous operation of the apparatus. When four tapered conductors have been made and wound on the spools 165-168, the spools are removed and are replaced by four empty spools.

The reference character 212 indicates a counter, which is suitably mounted on top of the block 204. The counter is actuated by a pin on the gear 196, as indicated in Fig. 7, and counts the number of rotations of the spools 165-168. Since the spools are one foot in circumference the counter will indicate the number of feet of wire on the spools at any stage.

Fig. 13 shows the arrangement for feeding the wires onto the spools 165-168 as they leave the electrolytic cells. A grooved rod 161 is provided, and is supported on two L-shaped members 159 and 160, which are fastened to the base 10. The grooves on the rod 161 have the same spacing as the spools 165-168. The rod 161 is axially movable. At the start of a processing operation, the rod is in the position in which it is shown in the drawing, where it is held by the spring 162. As the operation proceeds and the wires are wound up on the spools, the rod 161 is moved longitudinally to the right by turning the wing nut 163 once in a while. Thus the wires are prevented from piling up on the spools and are wound on in single layers. It is important that the wire be wound on in a single layer, because it is desirable to draw the wire off the spool in the way that it is wound on, that is, large end first. A single layer also ensures that the counter 212 will accurately indicate the number of feet of wire drawn through the cell system.

It will be in order now to discuss the gear ratios employed at the wire pulling mechanism, particularly the variable ratio between the speeds of the cones 171 and 172, with a view to making clear the different wire speeds that may be obtained.

It has been mentioned before that the speed of motor 179 is 1800 R. P. M. and that the ratio of the motor speed to that of the first cone 171 is 18 to 1. The speed of the cone, therefore, is 100 R. P. M. The ratio of the diameter of the cone 171 at its larger end to its diameter at the smaller end may be 4 to 1, and since cone 172 is the same, it follows that with the wheel 187 in its extreme right hand position (counter 190 at zero) the driving ratio between the cones is 4 to 1. Cone 172, therefore, rotates at a speed of 400 R. P. M. As regards the drive from the cone 172 to the shaft 202, the gear ratio 192—193 is 25 to 1, while the gear ratio 195—196 is 10 to 3. The speed of countershaft 194, therefore, is 16 R. P. M. and the speed of shaft 202 is 4.8 R. P. M., or .08 R. P. S. Now since the circumference of the spools carried on the shaft 202 is exactly 1 foot, the linear speed of the wire when it is drawn through the electrolytic cells and wound up on the spools will be .08 foot per second, or 12.5 seconds per foot. This is the maximum wire speed with the apparatus described.

The minimum speed of the wire can be calculated in the same way from the minimum speed of the cone 172, which is 25 R. P. M., and turns out to be .005 foot per second, or 200 seconds per foot. That the minimum speed of cone 172 is 25 R. P. M. will be clear from the fact that with the drive wheel 187 in its extreme left hand position (counter 190 reading 160) the driving ratio between cones will be 1 to 4.

The calculation of the wire speeds for intermediate settings of the lead screw is somewhat more complicated. The equation for determining the speed of cone 172 for any speed of cone 171 and any setting of the lead screws is—

$$S' = S \frac{d}{d'}$$

in which
S'=speed of cone 172
S=speed of cone 171
d=diameter of cone 171 at the point of drive
d'=diameter of cone 172 at the point of drive If we substitute in the above equation the value 100 for S and the values 4 and 1, respectively, for d and d', and solve for S', we obtain 400 as the speed of the cone 172, which checks with the value previously given. Substituting other values of d and d' corresponding to various intermediate settings of the lead screw as indicated by the counter 190 and solving for S' we may ascertain the speeds of cone 172 which result from such intermediate settings. The values for a few intermediate settings of the lead screw are given in the table below. From the cone speeds the wire speeds for the same lead screw settings can be calculated and such values are also included in the table.

| Lead Screw Setting | Cone Speed, R. P. M. | Wire Speed, Sec. per Ft. |
|---|---|---|
| 0 | 400 | 12.5 |
| 20 | 280 | 18 |
| 40 | 200 | 25 |
| 60 | 143 | 36 |
| 80 | 100 | 50 |
| 100 | 70 | 71.4 |
| 120 | 50 | 100 |
| 140 | 36 | 139 |
| 160 | 25 | 200 |

The above table is incomplete, but will suffice for the purposes of this explanation. A complete table or chart may be prepared on the same plan, showing the wire speeds in seconds per foot for all the lead screw settings from 0 to 160, inclusive. This table may be used in determining the proper lead screw settings which are required to produce any desired speeds, as will shortly be more fully explained.

It should be noted that although the values given for the cone speeds and wire speeds are theoretically correct, the actual values may differ slightly, due to the fact that the drive wheel 187 between the two cones must have an appreciable width and that the point of drive does not always coincide with the exact center of the wheel. This may cause slight variations in the values of d and d' for any particular lead screw setting. These variations seem to average out to some extent and are not serious. It may be stated that a table of wire speeds prepared by timing with a stop watch checks quite closely with the table prepared from the calculated values.

If desired a curve may be prepared in which the values for wire speed are plotted against the settings of the lead screw. By means of the curve the proper lead screw setting for any required wire speed may readily be determined.

The electrolyte used is a mixture of ortho phosphoric acid and sulphuric acid and preferably has the following composition:

| | Parts |
|---|---|
| $H_3PO_4$ | 300 |
| $H_2SO_4$ | 60 |
| $H_2O$ | 60 |

In the above formula, the proportions are given by volume. The sulphuric acid is concentrated, while the phosphoric acid is 85% concentrated, that is, it contains 15% of water.

The quantity of electrolyte should be relatively large as compared to the capacity of the electrolytic cells. For the apparatus shown the circulating system should hold five gallons or more of electrolyte.

Generally speaking, the invention is adapted for the processing of any kind of wire, although the electrolyte might have to be modified in certain cases. When liquid mercury is used for making the electrical connections to the wires, however, as in the apparatus disclosed herein, only wire which does not amalgamate readily can be used. That is, the composition of the wire must be such that it is not wet by the mercury. Fortunately for the manufacture of rheostats and potentiometers suitable resistance wire which is not readily attacked by mercury is available. The resistance wire known as "Nichrome" may be used, for example. Another resistance wire which has been used successfully has the following composition:

| | |
|---|---|
| Nickel | 35 percent |
| Chromium | 9 percent |
| Manganese | 1.6 percent |
| Silicon | 1 percent |
| Carbon | .04 to .1 percent |
| Iron | the balance |

Resistance wire of the above composition has a specific resistivity of about 600 ohms per circular mil foot, has a low temperature coefficient, and a fairly high tensile strength.

The apparatus described, with 12 mil slots, will handle wire up to about 10 mils in diameter. The slots could be made larger to take larger wire, but there is a limit in this direction imposed by the excessive leakage of water and electrolyte that would occur. The necessity of avoiding loss of mercury also imposes a limit on the size of the slots.

Before processing, the wire should be given a treatment known as depassivation, the object of which is to prepare the wire for the anodic treatment in the electrolytic cells. Unless the wire is depassivated the anodic reaction does not start promptly at all points on the surface of the wire when current is applied, and somewhat irregular and uncertain results are obtained.

In order to facilitate the depassivation treatment the wire should be wound on the spools such as 143, in spaced coils, with the coils in adjacent layers crossing each other in a kind of basket weave pattern, thus producing an open winding which is readily penetrated by the depassivating agent. The spools such as 143 should have ribbed or fluted winding spaces and should be made of material which is not attacked by acids.

The spools carrying the wire to be depassivated are first dipped in a cleaning solution such as is commonly used in electroplating processes, in order to make the wire chemically clean. The wire is then rinsed in water and is given a cyanide dip in order to remove any traces of the chemical cleaner that may remain. After rinsing once more, the wire is immersed in 40% hydrochloric acid for about thirty seconds and is then rinsed and dried. This completes the depassivation treatment. The treatment is effective for only a day or two and consequently the wire should not be depassivated until shortly before it is to be used, preferably on the same day, or the day before.

The operation of the apparatus in the manufacture of tapered conductors may now be explained. For this purpose it will be assumed that the apparatus is installed as described, and is to be started up for the first time, or is being started up after a shut down.

The main tank 73 is first filled with electrolyte of the hereinbefore stated composition. The electrolyte should almost completely fill the tank, as the loss of electrolyte to the rest of the system when the circulation is started will reduce the electrolyte in the tank to a safe working level, as indicated by the dotted line.

The switch 119 is now closed in order to start the motor 84, which drives the pump 83. The operation of the pump transfers electrolyte from the main tank 73 to the auxiliary tank 81 through the hose connection 85. The electrolyte in tank 81 immediately starts to drain out by way of the hose connection 93 to the cathode sections of the electrolytic cells, filling all the compartments such as 24, Fig. 10, with electrolyte up to the tops of the overflow tubes such as 39 and 40. As electrolyte continues to be supplied it overflows through the tubes such as 39 and 40 in each cathode compartment and is collected in the trough 90, whence it returns to the main tank 73 by way of the hose connection 101. Thus the circulation of electrolyte through the cathode compartments of the electrolytic cells is established and maintained.

The pump supplies electrolyte to the auxiliary tank 81 faster than it can circulate through the electrolytic cells and the tank soon fills, therefore, the excess draining off through the overflow pipe 86 and hose connections 87 and 89 to the vessel 90, containing the hydrometer 90', which is also filled and drains into the main tank 73 by way of the hose connection 91.

The wash water may now be turned on by opening the valve 105, which supplies water to the pipe 103, which in turn supplies water to the nozzles such as 107 and 108. Each nozzle directs a stream of water onto the mercury in the associated mercury compartment such as 59, Fig. 10, and fills the compartment, the water overflowing the partition such as 58 to the washing compartment such as 56, whence it overflows through a pipe such as 57 to the collection trough 97. From the collecting trough the water is allowed to run to waste through the hose connection 102.

As mentioned before, there is some leakage of electrolyte through the slots such as 27 and 28 in the walls of the cathode compartments and there is also a leakage of water through the slots in the partitions such as 55 and 62. The leakage electrolyte is collected in the compartments such as 48 and 69, whence it drains into the collecting trough 96, while the leakage water is collected in the compartments such as 52 and 57, whence it drains into the collecting trough 97. Thus the electrolyte and wash water circulating systems are kept entirely separate, notwithstanding the fact that they both leak.

The next operation is to turn on the supply of cooling water to the main tank 73 at valve 113'. The switch 120 in the circuit of the electromagnetic valve 112 can be closed at this time also. The valve remains closed, however, for its circuit is open at contacts of the relay 113. No cooling water is supplied to the tank, therefore, for the present.

When the switch 119 was closed it completed a circuit for the electromagnetic valve 80 and this valve accordingly opened. The gas may, therefore, be turned on at valve 79 and the burner 77 may be lighted. The heating of the electrolyte in the main tank 73 is thus started. The gas may be turned on full at the start in order to lose as little time as possible.

When the temperature of the electrolyte reaches about 46° C. the gas supply to the burner 77 is adjusted so that only a slight amount of excess heat is supplied to the tank. The heat supplied must be sufficient to produce a rise in the temperature of the electrolyte, but at a slow rate, so as to avoid waste of gas.

The thermal switch 116 is set to close at 47° C. When the temperature of the electrolyte reaches this value, therefore, the switch operates and closes a circuit for relay 113. Upon energizing, relay 113 closes a circuit for the electromagnetic valve 112, which now opens and admits cooling water to the coil 110 in the main tank 73. This stops the rise in the temperature of the electrolyte, which shortly begins to cool. The switch 116 then opens, relay 113 is deenergized, and the valve 112 is closed. The cooling operation as described above is repeated as often as required, depending largely upon the adjustment of the burner 77, and the arrangement is effective to maintain the temperature of the electrolyte within close limits.

The system will operate with the electrolyte at other temperatures than the one given above, provided the temperature is maintained constant. The reason why a variation in temperature is objectionable is that anodic reduction like electro-plating, effects a smaller actual transfer of metal than might be expected from theoretical calculation. In other words, the anode current efficiency is considerable less than 100%. The efficiency changes with changes in temperature, and, therefore, the temperature should be kept constant in order to eliminate this variable factor that would otherwise be present. Since the anode current efficiency increases with an increase in temperature, it is desirable to operate at a fairly high temperature. If the temperature is too high, however, disadvantages appear, such as excessive loss of water by evaporation. It has been found that very satisfactory results are secured if the temperature is maintained constant at some value which is about 46° C. or 47° C.

The density of the electrolyte should now be checked by means of the hydrometer 90'. It is found that good results are obtained if the specific gravity is maintained at about 1.600. The specific gravity is important as affecting the finish on the processed wire, a bright, smooth finish being obtained only if the specific gravity is maintained within a certain range. This range appears to have wider limits with higher temperatures, which is another reason for operating with the electrolyte at a fairly high temperature. So far as the finish is concerned, therefore, some variation from the stated value of 1.600 would be permissible, but the specific gravity also affects the anode current efficiency and hence should be held as close as possible to the value selected. The principal change that occurs in the specific gravity is due to the loss of water by evaporation. The hydrometer should be observed frequently and water added when required.

The operator may now close the switch 198, Fig. 6, to start the motor 179. The cones 171 and 172 are thus set in rotation and the hand wheel 191 may be rotated to set the counter 190 to zero. This operation moves the drive wheel 187 to its extreme right hand position, in which the cone 172 rotates at maximum speed. The switch 198 is now opened to stop the motor 179.

If not already done, four take-up spools such as 165–168 may now be placed on the shaft 202, where they are clamped in position by means of the wing nut 211, as shown in Fig. 6.

Four spools such as 140–143 containing depassivated wire may now be mounted as shown in Fig. 2. The end of wire 150 is then passed under the grooved rods 156 and 158, Fig. 2, and the grooved rod 161, Fig. 13, and is attached to the high left hand flange on the take-up spool 165, Figs. 6 and 13. The portion of the wire which extends between the grooved rods 156 and 158 may simply rest on top of the electrolytic cells for the present. The other wires 151, 152 and 153 are attached to spools 166, 167 and 168, respectively, in the same manner.

The operator should now adjust the wires properly in their respective grooves in the rods 156, 158 and 161, and will then see to it that the wires enter their respective slots in the various partitions and compartment walls of the electrolytic cell system. The wires may be guided into their slots and pressed down by hand and will readily fall into the proper positions. The relation of the wires to the other parts of the electrolytic cell system may be seen from Fig. 2, and also from Fig. 10, which shows the portion of wire 152 which extends through the anode section 18 and cathode section 19. All four wires are also seen in the plan view Fig. 3, except that they are not visible in the mercury compartments such as 59 nor in the cathode compartments such as 24, being immersed in the mercury and electrolyte which is contained in these compartments.

It will be seen that the wires extend through the electrolytic cell system on straight lines from the guide rod 156 to the guide rod 158. The force required to pull them through the cells is, therefore, very small, as previously mentioned. In fact, practically the only force required is that which is necessary to overcome the friction at the brakes on the spools 140–143. The brake friction should be just sufficient to keep the wires taut.

The motor generator set which includes the D. C. generator 125 may now be started, and as soon as the generator voltage is built up, the switch 134 may be closed to its upper position. The resistances 132 and 133 constitute an artificial load which has previously been adjusted to take approximately the same current as the electrolytic cell system. Enough of the current regulating devices such as 126 are now cut in by means of switches such as 127 to pass the desired amount of current, which in the case of the apparatus described herein, with four wires being processed simultaneously, is about 13 amperes. An accurate adjustment of the current can be made by means of the high shunt resistance 129 and the rheostat 130.

The factors having a bearing on the selection of the proper current value may be discussed briefly at this point.

The current density, referring to the current density at the anodes in the electrolytic cells, which are constituted by the wires being processed, should be as high as possible. One obvious reason for this is that the higher the current density the faster the anodic reduction. Another reason is that a fairly high current density is necessary in order to secure a bright, smooth finish on the wire. The current density is limited by the current carrying capacity of the wires, however, and should not be so high as to unduly heat the wires, which are in contact with the cell walls and partitions at the slots. The polystyrene of which the parts are made becomes soft at a rather low temperature.

Now the characteristic of a wire which determines the current density is its surface area, whereas the current carrying capacity or conductivity is determined by its cross section, other things being equal. Since as we increase the size of the wire the cross section increases faster than the surface area, the larger the wire the higher the permissible current density.

The current value of 13 amperes is a value which has been found experimentally to be satisfactory in the described apparatus for processing of fine wires, the smallest diameter of which is on the order of 1 mil. This amount of current does not raise the temperature of the wires beyond a safe point and at the same time it results in a sufficient anode current density to give a bright, smooth finish on wires up to 4 or 5 mils in diameter, or slightly larger.

It will be appreciated, however, that as the size of the wire is increased the current density will decrease, with the same total current, and will eventually become so low as to affect the finish on the wire. For wires having a larger minimum diameter than about 2 or 3 mils a considerably higher current value could be selected, and may be required. Whatever value is selected it should be kept constant, if wires having a desired predetermined taper are to be made. It should be borne in mind that in this discussion reference is being made to the apparatus disclosed, comprising sixteen cathode compartments and adapted to process four wires simultaneously. If the number of cells is increased, or the number of wires, the total current must be increased in proportion in order to obtain the same current density.

The statement that the current should be kept constant, of course, is in conformity with the preferred method of operation, in which all factors affecting the rate of anodic reduction are kept constant, except the time. By varying only the time factor the method is simplified and has been found to be suitable for the production of a considerable variety of tapers. It is recognized, however, that two or more different current values could be used, each on a different section of the wire, and each being kept constant while it is in use. For example, a current value of 25 amperes could be used on the larger half of the wire and a current value of 13 amperes on the smaller half. This procedure would complicate the process somewhat, but it would speed it up, and might be necessary in certain cases to give sufficient current density to produce a bright finish at the large end of the wire.

Continuing with the description, the apparatus is now ready for the processing of the four wires 150–153 which have been connected up, it being assumed that sufficient time has elapsed since the switching on of the artificial load to permit the current regulating devices 126 to warm up and attain a constant current carrying capacity. The operator may accordingly throw the switch 134 to its lower position, thereby disconnecting the generator 125 from the artificial load and connecting it to the bus bars 121 and 122 of the electrolytic cell system.

Current now starts to flow through the electrolytic cells and the anodic reduction of the wires begins. At this time the operator also closes the switch 199 to start the motor 179, thus setting the spools 165–168 in rotation and beginning to pull the wires 150–153 through the electrolytic cell system by winding them up on the spools. The counter 193 having been set at zero, the the linear wire speed is 12.5 seconds per foot.

The electrolytic cell system is approximately seven feet long, measuring from the point where the wires enter the first cathode section to the point where they leave the last cathode section, and accordingly it takes 87.5 seconds (7×12.5) for the seven foot sections of wire which were in the electrolytic cell system at the start of the operation to be pulled entirely through. It will be assumed now that the operator allows a few more feet of the wires to be pulled through and then stops the operation by switching the generator 125 back on to the artificial load and by stopping the motor 179. The operator can tell when to do this by observing the counter 212, which preferably was set to zero before motor 179 was started.

It should be stated that the foregoing assumption as to the procedure followed by the operator is based on the further assumption that the operator has no information as to the constants of the apparatus; that is, he does not know the wire speed which is required in order to produce the desired taper on the wires. He will naturally have to investigate this phase of the matter before he is able to produce any complete tapered wires having desired characteristics as to length and rate of taper. The resistance wires under consideration may be anywhere from 30 to 100 feet long, or many times longer than the electrolytic cell system.

The wire 153 may now be cut off where it leaves the electrolytic cell system, and the winding thereof on the spool 168 is completed by hand, the end being attached to the spool in any suitable manner, with a piece of tape, for example, or by engaging it in a notch in the right hand flange of the spool. This spool is then removed. The other wires 152–150 are then cut off one after the other, the unwound portions are wound up on their respective spools, the ends are attached to the spools to prevent unwinding, and the spools are successively removed.

We now have four test wires, each about fifteen or twenty feet long, which have been processed as described and wound up on individual spools. Each of these wires includes three parts, a section which was beyond the electrolytic cell system and attached to the associated take-up spool when the operation started, a seven foot section which was in the electrolytic cell system when the operation started, and which has been drawn out, and a third section which has been drawn in and out of the electrolytic cell system, or entirely through it.

Before explaining how these test wires are used, it will be advisable to go over the operation again and consider more in detail how it has affected the three sections above referred to.

Considering wire 153, for example, the first section thereof which extended between the electrolytic cell system and the take-up spool is obviously unaffected by the operation, being merely wound up on the spool.

The next section, the seven foot section, is in the electrolytic cell system when the operation starts, and successive portions of it from right to left are subjected for progressively longer times to the action of the electrolyte as the section is drawn out. It is to be expected, therefore, that this seven foot section will be tapered from the original diameter at the right to a smaller diameter at the left.

In order to explain more in detail the nature of the taper and how it is produced, the seven foot section may be considered as being made up of sub-sections 1, 3, 5, 7, etc., which were in the cathode sections at the time of operation was started, and sub-sections 2, 4, 6, etc., which were located in the contact selections at that time. The sub-sections are numbered from right to left, as the apparatus appears in Fig. 2.

Let us first consider the effect that is produced on the wire by its motion to the right for a distance sufficient to pull the odd numbered sub-sections of the wire, which were located in the cathode sections at the start, entirely out of such sub-sections. This distance is approximately 2⅛ inches in the apparatus shown herein.

Sub-section No. 1 was in the last cathode section 22, and is progressively reduced in diameter from right to left, as it is drawn out of the cathode section. That this is true will be evident from the fact that successive parts of the wire from right to left are subjected for progressively longer times to the action of the electrolyte.

Simultaneously with the tapering of sub-section No. 1, as described above identical tapers are produced at all the other odd numbered sub-sections as the result of their being pulled out of their respective cathode sections.

The movement of the wire which was sufficient to pull the No. 1 sub-section out of the last cathode section was, of course, effective to pull an equivalent length of the No. 2 sub-section into such cathode section, producing a taper which is complementary to that produced on the No. 1 sub-section. That is, the taper is reversed.

The same effect is produced at all the other even numbered sub-sections, 4, 6, etc., as they are drawn into the associated cathode sections next adjacent on the right. Each such even numbered sub-section is given a reverse taper.

The contact sections are somewhat longer than the cathode sections, that is, the space between two cathode compartments is somewhat longer than the length of a compartment, and consequently at this time there will be a portion of the No. 2 sub-section which has not yet entered the associated cathode section. The same is true of the other even numbered sub-sections.

Consider now the effect after the wire has moved to the right a little farther, or just sufficient to cause the left hand end of the No. 2 sub-section to enter the cathode section. This movement of the wire causes a part of the No. 2 sub-section to pass out of the cathode section, and is effective to move the taper along the wire from right to left, the part of the sub-section which passes out of the cathode section being reduced to a cylindrical formation. Again the effect is the same at the other even numbered sub-sections.

We may next consider the effect which is produced by the further movement of the wire to the right far enough to pull the No. 2 sub-section entirely out of the last cathode section 22, such movement causing the No. 3 sub-section to be drawn into said cathode section. The No. 2 sub-section has its contour changed to that of a cylinder throughout its length, for it has been pulled entirely through the cathode section and all points on its surface have been subjected to the action of the electrolyte for equal periods of time. The No. 3 sub-section, which was tapered by being drawn out of the cathode section in which it was located at the start, is reduced to a cylinder also, for the effect produced by pulling it out of one cathode section and into another is the same as that produced by pulling it into and out of the same cathode section.

It will be clear that the effect produced on the remaining odd numbered sub-sections is the same; that is, these sub-sections are all reduced to cylinders. Since the even numbered sub-sections also have a cylindrical formation at this time, the entire seven foot section we are considering, or rather that part of it which still remains in the electroyltic cell system, will be cylindrical in form, as it was before the operation started. Its diameter has been reduced, however.

We may consider next the result which is produced by the further movement of the wire to the right far enough to entirely withdraw the No. 3 sub-section from the last cathode section 22, such movement also causing the No. 4 sub-section to enter the cathode section.

From what has already been said it will be clear that the No. 3 sub-section is tapered as it is drawn out of the cathode section. The taper is similar to that which was produced on sub-section No. 1, but it will be understood that the largest diameter of the tapered sub-section No. 3 is the same as the smallest diameter of tapered sub-section No. 1, these sub-sections being connected by the cylindrical sub-section No. 2.

It will be unnecessary to continue farther with this detailed analysis. It will be clear that the complete seven foot section of wire, after it has been drawn entirely out of the electrolytic cell system, will be made up of sixteen tapered sub-sections, or the same number of sub-sections as there are cathode sections, and fifteen cylindrical sub-sections. The first tapered sub-section will have its largest diameter equal to that of the unprocessed wire, and each of the remaining tapered sub-sections will have a larger diameter which is equal to the smaller diameter of the next tapered sub-section to the right. The cylindrical sub-sections which join the tapered sub-sections will progressively decrease in diameter from right to left.

For practical purposes these cylindrical sub-sections may be neglected and the seven foot section may be considered as having a continuous taper from one end to the other. As a matter of fact the number of sub-sections is great enough so that the points where the contour of the wire changes from tapered to cylindrical can scarcely be detected.

As regards the remainder of wire 153, the section which is pulled through the electrolytic cell system following the seven foot section, it will be clear that this third section will have the form of a cylinder, the diameter of which is equal to the smaller diameter of the tapered seven foot section. That this is true will be evident from the fact that all parts of the third section are pulled entirely through the electrolytic cell system and are subject to the action of the electrolyte for equal periods of time.

The test wire 153 as thus produced, therefore, comprises an end section several feet long, which has not been subjected to the action of the electrolyte and which has its original diameter, a middle section seven feet long which may be regarded as being continuously tapered, and another untapered or cylindrical end section several feet long which is of reduced diameter.

The operator may now proceed to ascertain the diameter of the seven foot tapered section of wire 153 at its smaller end. The diameter at the other end, of course, is that of the original wire, which presumably is known. The smaller diameter is equal to the diameter of the smaller end section and is determined in any suitable manner. One method which is well adapted for use in connection with these small resistance wires is to measure the resistance of a carefully measured length of the end section and calculate the diameter from the result obtained and the known resistance of the material per circular mil foot.

Measurements may be made on the other three test wires in the same way. The results should be the same, or approximately the same. If the diameters thus determined are not substantially the same, the reason for the discrepancy should, of course, be found and corrected and additional test wires should be prepared. Improper depassivation might be the source of trouble. Assuming that the results on the four wires check, the average of the four diameters thus determined may be taken as the true diameter.

From this point on it will be convenient to continue the explanation with reference to Fig. 15, which illustrates the method of producing a resistance wire comprising a cylindrical end section having a diameter of $d_1$, a tapered section 21 feet long having a diameter $d_1$ at one end and a diameter $d_4$ at the other end, and another cylindrical end section having a diameter $d_4$. It will be assumed that this is the particular resistance wire that is to be made. The drawing also shows one of the test wires in superimposed relation, comprising a tapered section 7 feet long and the two cylindrical end sections as shown. As to this test wire, it will be assumed that the diameter of the tapered section at the smaller end, as determined by the measurements just described, is $d_5$.

A little consideration now will show that the test wire is not sufficiently tapered. Its diameter at the left hand end of the tapered section is $d_5$, whereas the diameter of the desired resistance wire at the corresponding point is $d_2$. The operator accordingly is advised that the time occupied in producing the tapered section of the test wire was insufficient. That is, the wire was drawn out of the electrolytic cell system in too short a time for the requisite amount of metal to be removed. The correct time can be determined by comparison of the volume of metal actually removed with the volume of metal which has to be removed in order to produce the required taper, the volume of metal removed being directly proportional to the time.

Suppose we let $V_0$ be the volume of metal removed from the seven foot tapered section of the test wire to reduce its diameter at the small end to $d_5$, and let $V_1$ represent the volume of metal which must be removed in order to reduce the diameter to $d_2$ instead of $d_5$. These volumes can readily be calculated.

Assuming that the volumes $V_0$ and $V_1$ have been calculated, we can let $t_0$ equal the time required to produce the taper actually produced on the test wire, that is, the time required to remove the volume $V_0$, and let $t_1$ equal the time required to produce the required taper, or the time required to remove volume $V_1$. Then $$t_0 : t_1 = V_0 : V_1$$

The time $t_0$ being known, and likewise the volumes $V_0$ and $V_1$, we can substitute the actual values and solve for $t_1$, thus obtaining the actual value of $t_1$ in seconds.

The operator can make some further calculations at this point, which should enable him to go ahead with the production of four resistance wires having the desired taper.

In order to explain this, reference may be made to Fig. 15 again, which shows the contour of one of the desired resistance wires, and consideration may be given to what further information will have to be obtained in order to carry out the operation successfully.

The resistance wire as depicted in Fig. 15 has a tapered portion which is 21 feet long, consisting of three seven foot sections, indicated as sections 1, 2 and 3.

Section 1 is the section that is in the electrolytic cell system when the operation starts. From the calculation already made it has been determined that if this section is pulled out in time $t_1$ the desired taper will be produced, that is, the tapered section will have a larger diameter equal to $d_1$ and a smaller diameter equal to $d_2$.

When section 1 is pulled out of the electrolytic cell system, section 2 is pulled in and will become tapered as indicated by the dotted lines 300. If section 2 is now drawn out at the same wire speed its contour will be reduced to that of a cylinder as indicated by the dotted lines 301. Section 2 should not be cylindrical, however, but should be tapered from a large diameter of $d_2$ to a smaller diameter of $d_3$. It will be evident that in order to produce this taper an additional volume of metal equal to $V_2$ will have to be removed.

Volume $V_2$ can be calculated, like volume $V_1$ was calculated, and will be slightly smaller than the latter volume. Time $t_1$, or the time required to remove volume $V_1$, has already been calculated. Then if $t_2$ is the time required to remove volume $V_2$, $$t_1 : t_2 = V_1 : V_2$$

Substituting the known values and solving for $t_2$, the time in seconds may be obtained as in the case of $t_1$.

We may now let $T_1$ equal the total time required to pull out section 1 and $T_2$ the total time required to pull out section 2. Then it will be evident that the following are true:

$$T_1 = t_1$$
$$T_2 = t_1 + t_2$$

Suppose now that section 2 has been pulled out of the electrolytic cell system in time $T_2$ and has been tapered from the larger diameter of $d_2$ down to the smaller diameter of $d_3$. At the same time, section 3 was drawn into the electrolytic cell system and was tapered as indicated by the dotted lines 302. Now if section 3 is pulled out of the electrolytic cell system in the same time that was spent in drawing it in, that is, in time $T_2$, it will be evident that a cylindrical contour will result, as indicated by the dotted lines 303; and it will be obvious that if the desired taper is to be produced a further volume of metal $V_3$ will have to be removed. The time required to remove this additional volume of metal may be represented by $t_3$, which can be computed in the same way that time $t_2$ was computed.

We may now let $T_3$ represent the total time required to elapse in pulling out section 3, and can write the equation $$T_3 = t_1 + t_2 + t_3$$

The times $T_1$, $T_2$, and $T_3$ having been calculated, each of these values may be divided by 7 in order to obtain the corresponding wire speeds. The wire speeds may be represented by $S_1$, $S_2$, and $S_3$. The operator may now refer to the table or curve which shows the relation between the wire speeds and lead screw settings and the lead screw settings corresponding to the wire speeds $S_1$, $S_2$, and $S_3$ may be determined and noted down.

Having completed the calculations described in the foregoing, the operator is now ready to proceed.

The first thing to do is to start the motor 179 to set the cones 171, and 172 in rotation. The hand wheel 191 may now be rotated in order to give the lead screw 182 the proper setting to produce a wire speed equal to $S_1$. The correct setting has previously been determined, as explained, and is made by turning the hand wheel until the counter 190 shows the proper number of turns. The lead screw setting having been completed, the operator will stop the motor 179.

Four empty take-up spools such as 165–168 may now be placed on the shaft 202, where they are secured in place by the wing nut. The counter 212 is set to zero.

The operator may then cut off the wires 150–153 just to the left of the point where they enter the electrolytic cell system. The parts of the wires which have been drawn into the electrolytic cell system are lifted out and discarded. The ends of the wires on spools 140–143 are then passed beneath the guide rods and are attached to the take-up spools as previously described. As before, the wires are properly located in the grooves of the guide rods and are pushed down into the slots in the cell partitions.

Everything being ready now, and the operator having checked the current to make sure it is the same as before, the switch 134 is again thrown to its lower position. The generator 125 is thus again connected to the bus bars 121 and 122 and current starts to flow through the electrolytic cell system. The switch 198 is also closed at this time, starting motor 179, and initiating the rotation of the take-up spools to pull the four wires through the electrolytic cell system.

One of these wires may be assumed to be the wire shown in Fig. 15. Section 1 of this wire is the section which is located in the electrolytic cell system at the start and is pulled out at a speed which is equal to $S_1$, calculated as previously described. It follows, therefore, that the section is drawn out in time $T_1$ and will become tapered from a diameter of $d_1$ at the larger end to a diameter of $d_2$ at the smaller end.

As the operation proceeds the counter 212 counts the number of rotations of the take-up spools and indicates the number of feet of wire drawn out of the electrolytic cell system at any instant. The operator watches the counter 212 and as soon as section 1 has been entirely drawn out, as indicated by the counter, he quickly changes the lead screw setting to the previously noted setting which corresponds to wire speed $S_2$. This can be done in a couple of seconds and is timed as accurately as possible to coincide with the time the end of section 1 leaves the last electrolytic cell.

Section 2 is now pulled out of the electrolytic cell system at the wire speed $S_2$, and in time $T_2$, whereby it is tapered from the diameter of $d_2$ at the larger end to the diameter of $d_3$ at the smaller end.

As the end of section 2 leaves the electrolytic cell system the operator quickly changes the lead screw setting again, this time to the previously noted setting which corresponds to the wire speed $S_3$.

Section 3 is accordingly drawn out of the electrolytic cell system at the wire speed $S_3$, and in time $T_3$, and is tapered from the diameter of $d_3$ at the larger end to the diameter of $d_4$ at the smaller end.

When the end of section 3 leaves the electrolytic cell system the operator will note the fact, counter 212 indicating that 21 feet of wire have been drawn out, but makes no further change in the wire speed. The wire continues to be pulled out at the speed $S_3$, therefore, and a cylindrical end section is formed having the diameter $d_4$. When this end section is long enough the operator will stop the operation by reversing switch 134 and opening switch 198.

The four wires are now cut off just to the right of the electrolytic cell system, the unwound portions are wound up on the respective take-up spools and the spools are removed all as previously described.

Four tapered wires have now been produced, each comprising a cylindrical end section having a diameter of $d_1$, a section 21 feet long which tapers from a diameter of $d_1$ at the larger end to a diameter of $d_4$ at the smaller end, and a cylindrical end section having a diameter of $d_4$. These wires should conform to specifications, provided the operations have been carried out as described.

The operator may proceed now to make four more tapered resistance wires in the same manner. In this connection it should be noted that the lead screw setting must be changed first to the proper setting corresponding to speed $S_1$, since the cones 171 and 172 have to be in rotation when the change is made. It should be noted also that the sections of wire which were in the electrolytic cell system when the preceding four wires were completed have to be cut off and discarded, if the described procedure is followed.

The treatment of the tapering theory in the foregoing explanation has been general, with a view to promoting an understanding of how the taper is produced, and the principles involved in predetermining the wire speeds and lead screw settings which are necessary to produce such tapers as may be required.

In this connection it will be understood that the directions given are applicable to any size of wire within the capacity of the apparatus, the wire size being limited only by the size of the slots. With 12 mil slots wire up to about 10 mils in diameter may be handled, and the size of the slots could be increased somewhat. It will be understood also that the directions are applicable to the manufacture of resistance wires of any desired length, although the length should be some multiple of the length of the electrolytic cell system, which in the case of the apparatus described is approximately 7 feet. Fig. 14 shows an exaggerated taper, which would reduce the wire to zero diameter if prolonged through another 7 foot section, but this is a rather extreme case. As a rule much longer wires are required, comprising from 5 to 12 or more sections and in such wires the slope of the taper is correspondingly reduced.

As regards the form of the taper it will be evident from an inspection of Fig. 14 that the taper there shown is a conical or straight line taper, when considered from the standpoint of the decreasing wire diameters $d_1$, $d_2$, $d_3$, and $d_4$. In other words, a curve constructed by plotting the successively decreasing section end diameters against the corresponding distances measured along the wire is a straight line. The case is different if considered from the standpoint of the decreasing cross-section of the wire, since the cross-section at any point is proportionate to the square of the diameter at that point. A curve constructed by plotting successively decreasing cross-sections against the corresponding distances is an exponential curve defined by an equation of the second order.

In the manufacture of tapered wires for potentiometers the resistance curve is of primary interest. Since the resistance of a wire is directly proportionate to its cross-section, the resistance curve will be of the same type as the cross-section curve. Hence the resistance curve of the tapered wire shown in Fig. 14 will be a second order or "square" curve.

If it is desired to make a resistance wire having a straight line resistance curve, then the cross-sections at the ends of the seven foot sections can be computed from the resistance curve and from the values thus obtained the corresponding diameters can be calculated. These diameters can then be used to calculate the wire speeds in the manner already explained. Following the same procedure resistance wires having other types of resistance curves can be made.

In order to give a more definite idea of what may be expected in the practice of the invention, especially as to the time values involved, the data used in the manufacture of a representative resistance wire with the apparatus disclosed herein will now be given.

The resistance wire selected for this purpose is made of the alloy previously referred to herein and has an overall length of about 49 or 50 feet, including a central tapered section having a length of 35 feet. The diameter of the original wire and the diameter of the tapered section at the larger end is 4.9 mils. The taper is conical, with a slope of .1000 mil per foot, and accordingly the diameter of the tapered section at the smaller end is 1.4 mils.

The table below gives the data for the manufacture of the above wire, it being understood that four wires are made at the same time, and that the values for total current, electrolyte density and electrolyte temperature are as previously recommended herein.

| Section | Feet | T | S | L |
|---|---|---|---|---|
| 1 | 0–7 | 201.88 | 28.8 | 49 |
| 2 | 7–14 | 383.57 | 54.8 | 86 |
| 3 | 14–21 | 545.07 | 77.8 | 105 |
| 4 | 21–28 | 686.39 | 98 | 119 |
| 5 | 28–35 | 807.52 | 115.3 | 128 |

In the above table the meaning of the entries in the first two columns will be obvious. The values of T given in the third column are in seconds and are calculated as already explained. Each entry in this column shows the total time T that should elapse while the corresponding section is being drawn out of the electrolytic cell system. The values of S in the fourth column are the wire speeds in seconds per foot and are obtained by dividing the corresponding values of T by 7. The values of L in the fifth column are the lead screw settings in turns, as indicated by the counter, and are obtained from a curve such as has been previously mentioned, which was made by plotting the lead screw settings against the corresponding wire speeds.

In the manufacture of the wire the operator makes use of only the entries in the last column. The initial lead screw setting is 49, and accordingly section 1 of the wire is pulled out of the electrolytic cell system at a wire speed of 28.8 seconds per foot and in a total time of 201.88 seconds. The operator keeps track of the sections by means of the counter 212 and as the end of the first section leaves the electrolytic cell system, or is about to leave, he changes the lead screw setting from 49 to 86, with the result that section 2 is pulled out at a wire speed of 54.8 seconds per foot and in a total time of 383.57 seconds. The operation proceeds in this manner, with lead screw settings of 105, 119 and 128 as sections 3, 4 and 5, respectively, are pulled out. The last lead screw setting remains unchanged while the cylindrical section at the end is pulled out. The end sections are not shown in the table.

The total time required in the electrolytic cell system may be found by adding up the values of T in column 3 of the table, including an additional entry equal to the last entry to take care of the smaller end section, and will be found to be a little more than 57 minutes. The time required for other resistance wires is in proportion to the amount of metal that has to be removed.

The output of the apparatus in making this specific resistance wire is about four wires per hour. The output can readily be increased by increasing the capacity of the machine, which can easily be arranged to handle more wires at a time.

While the procedure explained in the foregoing gives excellent results, a possible objection, if it can be referred to as such, is that the accurate timing of the changes in lead screw settings is interferred with to some extent by the impossibility of making such changes instantaneously. The time required to make a change is very small in comparison with the time required to pull a seven foot section through the electrolytic cells, and consequently the operation is not critical, but a chance for some slight irregularity does exist, especially if the changes in lead screw settings are made manually as described.

A procedure which may be adopted to facilitate timing and to minimize the effect of an occasional inaccuracy consists in making the first change in the lead screw setting after six feet of wire have been pulled out and in changing the setting every three feet thereafter, the changes being proportionately smaller than those which would be required if made only every seven feet. This procedure has been used successfully on a number of different resistance wires. The first change is started a little in advance and the other changes are rather small and can be made very quickly.

There are other reasons which may make more frequent changes in lead screw settings desirable. When the setting is changed once per section, the apparatus inherently turns out seven foot sections each having a straight line resistance curve, which is eminently suited to the manufacture of multisection wires having the same type of resistance curve. This characteristic of the apparatus, however, makes it somewhat less suitable for the manufacture of resistance wires having a conical taper or resistance wires having resistance curves which are not straight lines. This is not to say that satisfactory wires having such tapers cannot be made in this way, for the taper is corrected every seven feet and the departure within each section is generally too small to be material, especially if the wire contains a considerable number of sections. In case it should be desired to modify the normal taper in the sections to make it conform more closely to some desired over all taper, it can be done by introducing appropriate changes in the lead screw settings.

In referring to lead screw settings here and elsewhere, we have in mind the particular wire pulling mechanism which is shown and described herein. It will be understood, however, that any other suitable wire pulling mechanisms can be used, so long as it includes some device by means of which different wire speeds may be obtained as required.

The electrolytic cell system has been fully described and a certain amount of explanation as to its operation has been made. A few supplementary remarks may be helpful nevertheless.

Referring to Fig. 10, when the wire 152 leaves the cathode section 17, it pulls a certain amount of electrolyte along which drains into compartment 48. The wire is wet with the electrolyte, however, as it enters the washing compartment 56. Here the electrolyte is thoroughly washed off, a good circulation of wash water being maintained. The water also wets the wire but is squeezed off as the wire enters the mercury compartment 59, together with a trace of electrolyte that may remain.

Thus the transfer of any substantial amount of electrolyte to the mercury compartment is prevented. Notwithstanding this, it is found that if the wash water is supplied directly to the washing compartment, the mercury will become dirty after a time and lose a part of its surface tension. Whether this is due to exposure to the air or to a slight contamination with electrolyte or to some other cause is not certain, but it is known that all trouble from this source is eliminated by introducing the wash water into the mercury compartment, whence it overflows into the washing compartment. This arrangement keeps the mercury clean and bright.

It will not be necessary to go into the details of the electro-chemical action which takes place, it being known that with an electrolyte of the type disclosed herein the flow of the electric current will cause the removal of metal from certain metallic anodes, the metal removed forming soluble salts. Generally speaking, this is what takes place in the apparatus described, when tapering wire made from the alloy previously referred to herein. It may be mentioned that the iron in the alloy tends to plate out on the cathode to some extent. This does no harm. An objectionable feature, however, is that the silicon forms an insoluble compound, a form of water glass, which after a time tends to clog the passages for the flow of electrolyte through the cells. This objection is not serious and can be overcome by the installation of a filter, preferably in the pipe connection which returns the electrolyte from the collecting trough to the main tank.

When the current is first turned on, it is substantially equally divided between the individual electrolytic cells. This is to be expected because the current divides in accordance with the resistance of the cells and the cells are all alike and have approximately the same resistance.

A substantial part of the total resistance of each cell, however, is the resistance of the wire itself. The result is that as the operation proceeds and the wire in the apparatus becomes tapered, the resistances of the several cells do not remain the same, but begin to increase in accordance with the increasing wire resistance at such cells. The wire in the apparatus becomes tapered from left to right, that is, the entering wire at the left always has the same original diameter, while the emerging wire at the right becomes progressively smaller, and accordingly the increase in cell resistance is progressive from left to right, being a maximum in the last cell.

Now the total current through all the cells is maintained constant, and since it must divide between the several cells in accordance with their respective resistances, a gradual current shift takes place as the tapering operation proceeds, the current progressively decreasing in the cells toward the right and progressively increasing in the cells toward the left of the center of the apparatus. The current shift corresponds to the taper on the wire in the apparatus at any instant but is not proportionate in extent or amount because the wire resistance at any cell constitutes only a part of its total resistance, the remaining resistance being independent of the size of the wire. It follows that the amount of current shift is considerably less than would be expected from a consideration of the difference between the size of the wire at the entering end and its size at the emerging end of the apparatus. For example, in the manufacture of the tapered wire previously referred to herein, which tapers from a larger diameter of 4.9 mils to a smaller diameter of 1.4 mils, the current in the last cell drops from an initial value of about .8 ampere to a final value of about .28 ampere. The final value is therefore about one third the initial value. At the first cell the current rises from an initial value of about .8 ampere to a final value of about 1.3 amperes.

The shift in the current toward the entering end of the apparatus affects the current density somewhat. At the start of a tapering operation the current density is approximately the same at all the cells. At the end of the operation there is an overall increase in the current density, due to the current being maintained constant and to the reduction of the area of wire in the apparatus which is exposed to the electrolyte. This increase is distributed between the several cells in accordance with the current they carry and the area of the wire in the electrolyte, and is a maximum at the first cell. At the last cell the increase is very small and the current density may be considered as remaining substantially constant, the decrease in the size of the wire just about compensating for the decrease in the current. If the wire is being reduced to a smaller diameter than 1.4 mils the current density in the last cell may decrease slightly toward the end of the operation but not enough to interfere with the production of a satisfactory smooth finish on the wire.

The shift in the current toward the entering end of the apparatus also affects the amount of work done at the several cells in removing metal from the wire, the amount of metal removed being proportional to the current. At the start the several cells do equal amounts of work, but as the tapering of a wire proceeds, a shift in the work takes place which corresponds to the current shift. This work shift modifies the operation somewhat, but it does not appear to greatly affect the calculations of wire speeds based on the amount of metal to be removed at the several sections. It has been observed that there is no very sharp demarcation between the end of the tapered section and the following cylindrical section, the "corner" being slightly rounded off, so to speak. This effect has been attributed to the work shift. It is generally advantageous rather than otherwise, but can be corrected if desired by a change in the wire speed.

It will be understood that in setting the apparatus up for the manufacture of any particular tapered wire, the first few lots of wire made should be carefully tested to ascertain how closely they conform to the requirements, and appropriate adjustment of the wire speeds should be made if found to be necessary. No adjustment may be required, but if it is, the results of the tests will indicate where the adjustment should be made and the degree of change that is necessary. Having once determined the correct wire speeds, it will be found that substantially uniform resistance wires having required characteristics may be turned out by careful adherence to such speeds and by maintaining constant the other factors which affect the operation.

The apparatus described herein may also be used to manufacture very fine wire which cannot be made by the usual drawing operations. In this connection it may be explained that the smallest wire which it is practicable to make by drawing is about 2 mils in diameter. Smaller wire can be made but only at a great expense. By means of the present invention wire having a diameter of about 2 mils or more, such as can be readily made by drawing, can readily be reduced to any desired smaller diameter down to 1 mil or less by pulling it through the apparatus at a constant speed. The first few feet of wire, depending on the length of the apparatus, will of course be tapered but the remainder will be of uniform cross-section. The wire speed will depend on the amount of reduction which is to take place, and can be calculated or determined experimentally.

In the foregoing a considerable amount of specific information has been given as to the construction of the apparatus and the method of operating the same; but it will be understood that this has been done to facilitate the explanation of the principles involved and to afford information as to one way in which they may be employed in the successful practice of the invention. Without departure from these principles, numerous variations and modifications may be made, both as to the apparatus and the method of procedure and we do not, therefore, wish to be limited to the exact disclosure herein, but desire to include and have protected all forms and modifications of the invention which come within the scope of the appended claims.

We claim:

1. The method of making a tapered wire by means of a plurality of electrolytic cells arranged in a row, said wire including two sections each equal in length to the length of said row, which consists in inserting the first of said sections in said cells, passing current through said cells with said wire functioning as the anode, pulling said first section axially out of said cells and the second section axially into said cells at constant speed, thereby tapering said first section, and pulling said second section axially out of said cells at a predetermined slower constant speed such that a taper is produced on the second section having the same slope as the taper produced on the first section.

2. Apparatus for the tapering of a moving conductor by anodic reduction, said apparatus comprising, in the direction of conductor movement, a compartment containing an electrolyte, a compartment containing wash water, and a compartment containing mercury, said compartments having slotted walls to permit said conductor to be pulled through on a straight line, two compartments located below said straight line and between said electrolyte compartment and said wash water compartment for receiving electrolyte and water, respectively, which leaks through the slots in the walls of the electrolyte and wash water compartments, a cathode immersed in said electrolyte, and a metallic member in said mercury compartment electrically connected to said conductor by the mercury therein.

3. Apparatus for tapering a moving conductor by anodic reduction and comprising, in the direction of conductor travel, a compartment containing mercury, a compartment containing an electrolyte, a compartment containing wash water, and another compartment containing mercury, said compartments having slotted walls to permit said conductor to be drawn through on a straight line, said electrolyte compartment being spaced away from the preceding and succeeding compartments, electrolyte collecting compartments located on opposite sides of said electrolyte compartment, means for draining leakage electrolyte from said collecting compartments to maintain the level of electrolyte therein below said conductor, said collecting compartments including wall portions below said straight line but higher than said electrolyte level, a cathode immersed in the electrolyte in said electrolyte compartment, metallic members in said mercury compartments electrically connected to said conductor by the mercury therein, and means for continuously supplying wash water to said wash water compartment.

THOMAS B. GIBBS.
SAMUEL DINERSTEIN.
GEORGE W. GILMAN.

REFERENCES CITED

The following references are of record in the file of this patent:

UNITED STATES PATENTS

| Number | Name | Date |
|---|---|---|
| 686,395 | Desolle | Nov. 12, 1901 |
| 1,068,412 | Chubb et al. | July 29, 1913 |
| 1,226,471 | Coolidge | May 15, 1917 |
| 1,298,155 | Anthony | Mar. 25, 1919 |
| 1,614,562 | Laise | Jan. 18, 1927 |
| 1,731,269 | Rich | Oct. 15, 1929 |
| 1,768,358 | Harrison | June 24, 1930 |
| 1,939,902 | Kaul | Dec. 19, 1933 |
| 2,075,331 | Antisell | Mar. 30, 1937 |
| 2,093,238 | Domm | Sept. 14, 1937 |
| 2,129,170 | Frank et al. | Sept. 6, 1938 |
| 2,153,996 | Selvig | Apr. 11, 1939 |
| 2,271,736 | Hall | Feb. 3, 1942 |
| 2,307,928 | Hogaboom | Jan. 12, 1943 |
| 2,370,973 | Lang | Mar. 6, 1945 |

FOREIGN PATENTS

| Number | Country | Date |
|---|---|---|
| 4,120 | Great Britain | of 1897 |